United States Patent [19]
Ernest et al.

[11] Patent Number: 4,827,348
[45] Date of Patent: May 2, 1989

[54] EXPOSURE CONTROL SYSTEM FOR DUAL MODE ELECTRONIC IMAGING CAMERA

[75] Inventors: Paul W. Ernest, Arlington; Allan C. Green, Framingham, both of Mass.

[73] Assignee: Polaroid Corporation, Cambridge, Mass.

[21] Appl. No.: 189,473

[22] Filed: May 2, 1988

[51] Int. Cl.⁴ .............................................. H04N 5/238
[52] U.S. Cl. .................................... 358/228; 358/225; 358/909
[58] Field of Search .................... 358/228, 225, 213.19, 358/909, 213.13

[56] References Cited

U.S. PATENT DOCUMENTS

| | | | |
|---|---|---|---|
| 3,918,077 | 11/1975 | Burton et al. | 354/234 |
| 4,079,390 | 3/1978 | Iwata et al. | 354/44 |
| 4,339,190 | 7/1982 | Sugiura | 354/234 |
| 4,363,034 | 12/1982 | Grancoin et al. | 358/213 |
| 4,401,380 | 8/1983 | Sato et al. | 354/246 |
| 4,453,816 | 6/1984 | Hiraike | 354/271.1 |
| 4,541,016 | 9/1985 | Ochi et al. | 358/228 |
| 4,551,764 | 11/1985 | Ogawa | 358/228 |
| 4,553,170 | 11/1985 | Aoki et al. | 358/225 |
| 4,558,368 | 12/1985 | Aoki et al. | 358/228 |
| 4,566,029 | 1/1986 | Johnson | 358/50 |
| 4,570,179 | 2/1986 | Lees | 358/50 |
| 4,571,045 | 2/1986 | Uematsu | 354/245 |
| 4,571,629 | 2/1986 | Horio et al. | 358/225 |
| 4,599,657 | 7/1986 | Kinoshita et al. | 358/228 |
| 4,668,067 | 5/1987 | Simon et al. | 354/246 |
| 4,746,988 | 5/1988 | Nutting et al. | 358/228 |
| 4,750,041 | 6/1988 | Vogel et al. | 358/213.13 |

Primary Examiner—Jin F. Ng
Assistant Examiner—Stephen Brinich
Attorney, Agent, or Firm—Edward S. Roman

[57] ABSTRACT

A method and apparatus for exposure control of electronic imaging cameras capable of video and still modes of operation and having an automatic variable aperture diaphragm to control image light passing to a sensor during the video mode of operation. Relatively short exposure time intervals are attained in the still mode of operation by attenuating light passing to the sensor during the video mode so that the aperture to which the variable aperture diaphragm is set is increased over that to which it would normally be adjusted during video operation. Upon conversion to the still mode, the filter attenuation is rapidly removed resulting in a correct aperture setting for the relatively shorter still mode exposure time intervals. In the video mode, electronic shutter operation is effected in the conventional manner. In the still mode of operation, the exposure time interval is established either by a combination of electronic shutter operation and mechanical shutter operation or by mechanical operation alone. A shutter mechanism is disclosed in which the light attenuating and exposure terminating functions are combined.

21 Claims, 5 Drawing Sheets

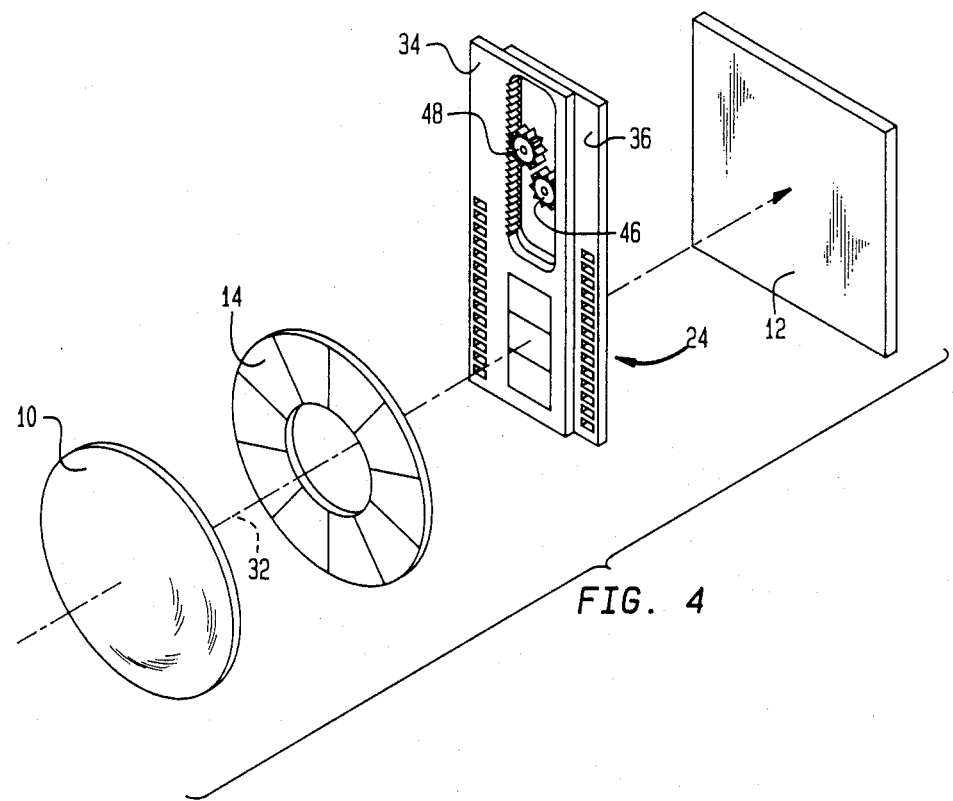
FIG. 4
FIG. 5
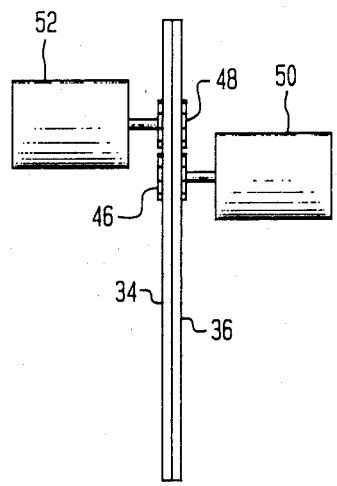

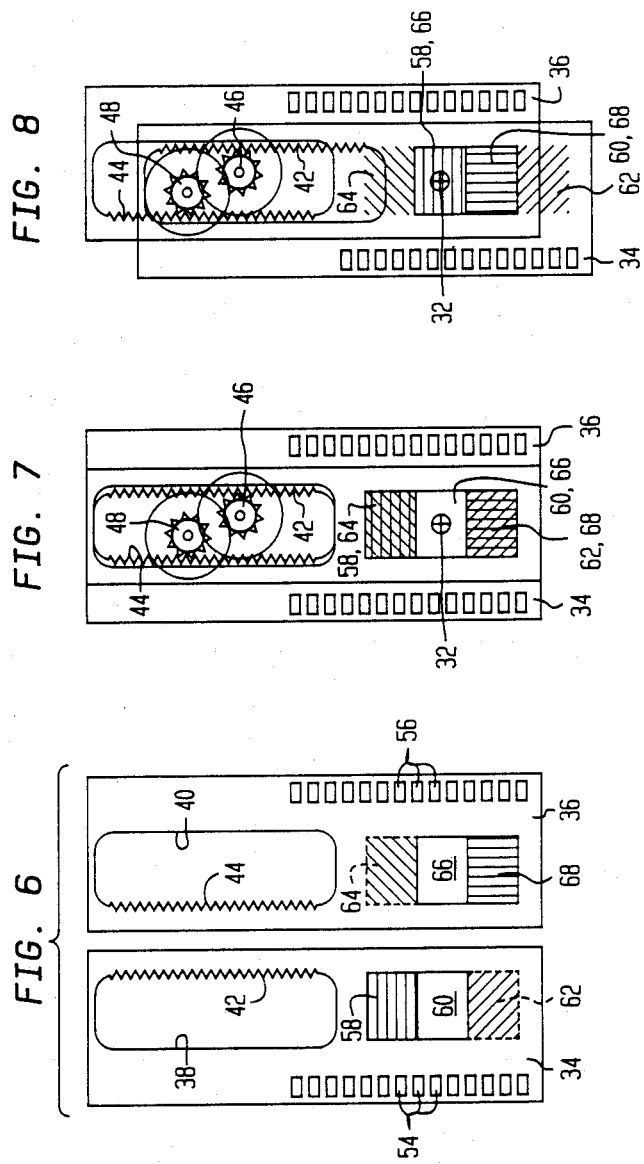

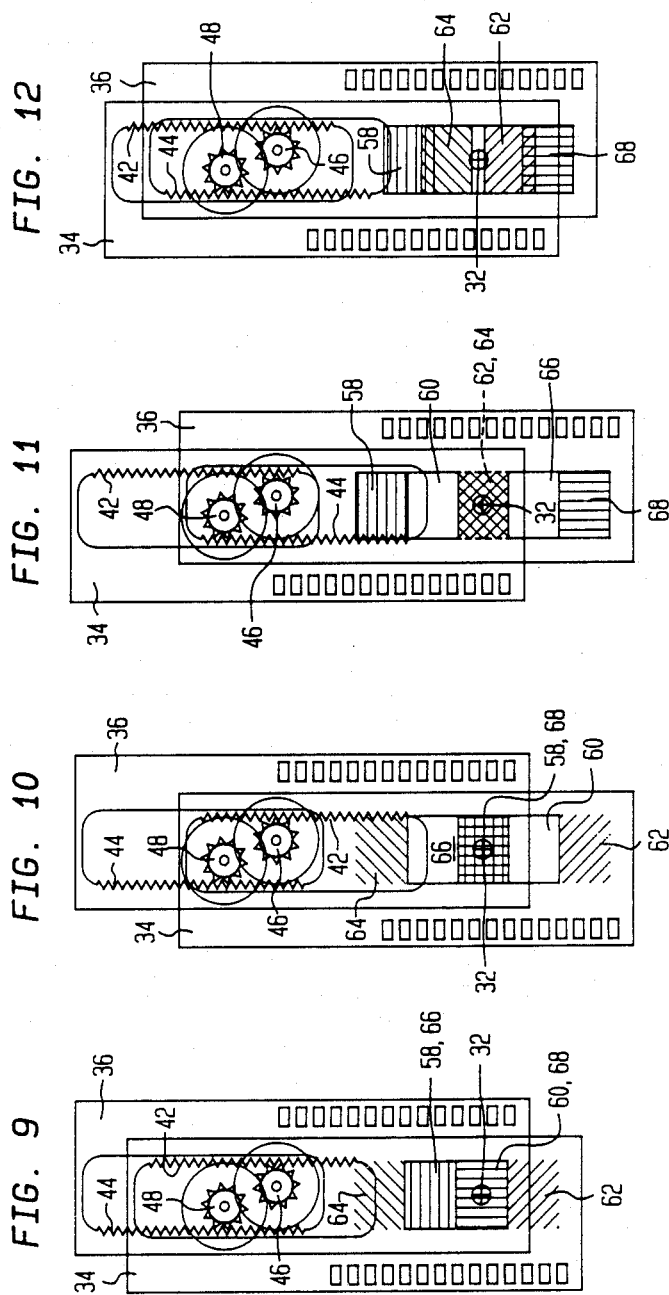

EXPOSURE CONTROL SYSTEM FOR DUAL MODE ELECTRONIC IMAGING CAMERA

BACKGROUND OF THE INVENTION

This invention relates to electronic cameras and, more particularly, it concerns a method and apparatus for exposure control in electronic cameras having video and still modes of operation.

NTSC video cameras are well known in the art and conventionally employ an optical system to present light images to a solid state sensor, such as a charged couple device (CCD), at effective electronic shutter speeds of 1/60 second to generate 30 image frames per second using 488 interlaced lines at the 15.7 kHz rate. A timing diagram depicting the operation of a conventional NTSC system in both video (motion picture) and still modes of operation appears in FIG. 1 of the attached drawings. In the video mode of operation, the length of time during which each of a Field A and a Field B is integrated or exposed to image light is controlled electronically without a mechanical shutter mechanism by alternately integrating and discharging or reading out the respective two fields in synchronism with timing control supplied by a CCD Clock. Such electronic shutter operation is due to the characteristics of a CCD, namely, it becomes relatively insensitive to light during readout. Moreover, the same electronic shutter operation may be used when the camera is switched to a still mode of operation by clearing the CCD (again in synchronism with CCD Clock timing), integrating the CCD to the desired still image and terminating CCD exposure by readout. In this connection, it is to be noted that the still mode of operation employs a different method of CCD signal formation and readout than the video mode but the exposure sequence for both is as depicted in FIG. 1 of the attached drawings.

From the foregoing, it will be seen that a conventional NTSC video camera can be operated using the electronic shutter feature in both video and still modes of CCD exposure; subject, however, to the use of the same 1/60 second shutter speeds in both modes of operation. While shutter speeds of this order are acceptable for motion picture images, it is apparent that a high quality still photograph of a moving subject will require shorter exposure times.

The problems associated with the shutter speed requirements of video/still or dual mode video cameras have been addressed in the prior art. For example, U.S. Pat. No. 4,551,764 issued Nov. 5, 1985 to Kimiaki Ogawa discloses a video camera system in which an iris diaphragm, normally adjusted automatically as a variable lens aperture for operation in the video mode of operation, is converted to a mechanical shutter for CCD exposure in a still mode of operation. While the disclosure of the Ogawa patent appears to achieve shutter speeds faster than 1/60 second, no specific still mode shutter speeds are mentioned. It is generally known, however, that shutter speeds as fast as 1/250 or 1/500 second are difficult, if not impossible, to achieve using mechanisms of the type represented by iris diaphragms used for automatic aperture control. In addition, no provision is made in the disclosure of the aforementioned patent for aperture adjustment in the still mode of operation. While the extent to which the iris diaphragm is open may provide for aperture adjustment, such operation means that as shutter speeds increase the blades of the iris diaphragm must move further to provide a corresponding increase in aperture size. In other words, faster effective shutter speeds would require more mechanical shutter component movement to achieve the needed larger aperture stop for proper exposure than slower shutter speeds which require smaller apertures. In addition, the mechanical components of the iris diaphragm must be switched from one in which it is controlled automatically by the exposure control system operative in the video mode to one in which it must be abruptly closed to terminate a still exposure of the CCD. As a result, the total duration of time required for exposure of the CCD to generate a still photograph and then return to normal motion picture video operation is increased.

In light of the foregoing, there is a need for an improved exposure control system for video cameras of the type referred to.

SUMMARY OF THE INVENTION

In accordance with the present invention, a method and apparatus for dual mode video camera operation is provided by which the proper exposure is assured both in a video mode using electronic shutter operation and in a still mode using a mechanical shutter effective to shutter speeds of 1/500 second or faster.

In the practice of the present invention, conventional NTSC video camera operation is effected in an electronic shutter mode using an automated lens aperture to assure correct exposure of the CCD sensor at the normal 1/60 second shutter speed. The mechanical shutter for still mode operation is preset to shutter speeds ranging from 1/60 second and faster. When a still mode shutter speed faster than 1/60 second has been selected, a neutral density filter, having an attenuation factor equivalent to the ratio between video and still mode shutter speeds, is inserted between the automatic iris diaphragm and the CCD sensor to allow the aperture of the diaphragm to be increased to the correct stop value for the selected still mode shutter speed. During operation in the motion imaging video mode, the quantity of image light to which the CCD is exposed, is controlled by a combination of the iris diaphragm stop setting and the neutral density filter attenuation. As such, CCD exposure light is virtually unchanged from that which would pass during normal video operation without the filter. When the camera is switched from the video mode to the still mode, however, the neutral density filter is removed from the optical path to the CCD and the shutter mechanism is actuated with the iris diaphragm at the correct aperture value for the preset shutter speed.

In a preferred embodiment, the mechanical shutter combines the shutter and filter functions in a pair of light weight reciprocable blades driven by electronic stepping motors. Each of the pair of blades carries an open sector and at least one filter sector. Where four shutter speeds corresponding to four aperture stops are used, for example, 1/60, 1/120, 1/250 and 1/500 seconds, the filter sectors on the respective blades are distinguished by one full aperture stop in a manner so that a combination of open and filter sectors may provide neutral density filter attenuation corresponding to 0, 1, 2 or 3 aperture stops. Shutter operation is effected by positioning of open and opaque areas of the blades in front of the CCD sensor. For example, a shutter close condition is obtained by reciprocating both blades so that the opaque area of at least one blade blocks passage of light to the CCD sensor. A full open condition of the shutter is achieved when both open sectors are in registration with each other. Also the blades may be driven so that the two open sectors establish a narrow slot which traverses the plane of the CCD sensor in the manner of a scanning shutter.

Among the objects of the present invention are, therefore, the provision of an exposure control method and apparatus for dual mode electronic imaging camera operation which permits high shutter speed in the still mode of operation while at the same time enables normal electronic shutter operation during use of the camera in a video or motion picture mode. Another object of the invention is to provide such a method and apparatus by which the exposure of the electronic sensor in the camera at diverse shutter speeds is accompanied by appropriate lens apertures. Other objects and further scope of applicability of the present invention will become apparent from the detailed description to follow taken in conjunction with the accompanying drawings in which like parts are designated by like reference numerals.

BRIEF DESCRIPTION OF THE DRAWINGS

As above indicated.

FIG. 4 is an exploded perspective view illustrating the optical components of the exposure control system in accordance with the present invention;

FIG. 5 is a side elevation illustrating the mechanical shutter blade assembly of the present invention;

FIG. 6 is a front elevation illustrating the pair of shutter blades used in the system of the present invention;

FIGS. 7-11 are front elevations illustrating the mechanical shutter of the present invention in different operating conditions; and FIG. 12 is a front elevation similar to FIGS. 7-11 but depicting operation of the shutter mechanism in a scanning shutter mode.

DETAILED DESCRIPTION OF THE PREFERRED EMBODIMENT

Figure 3:
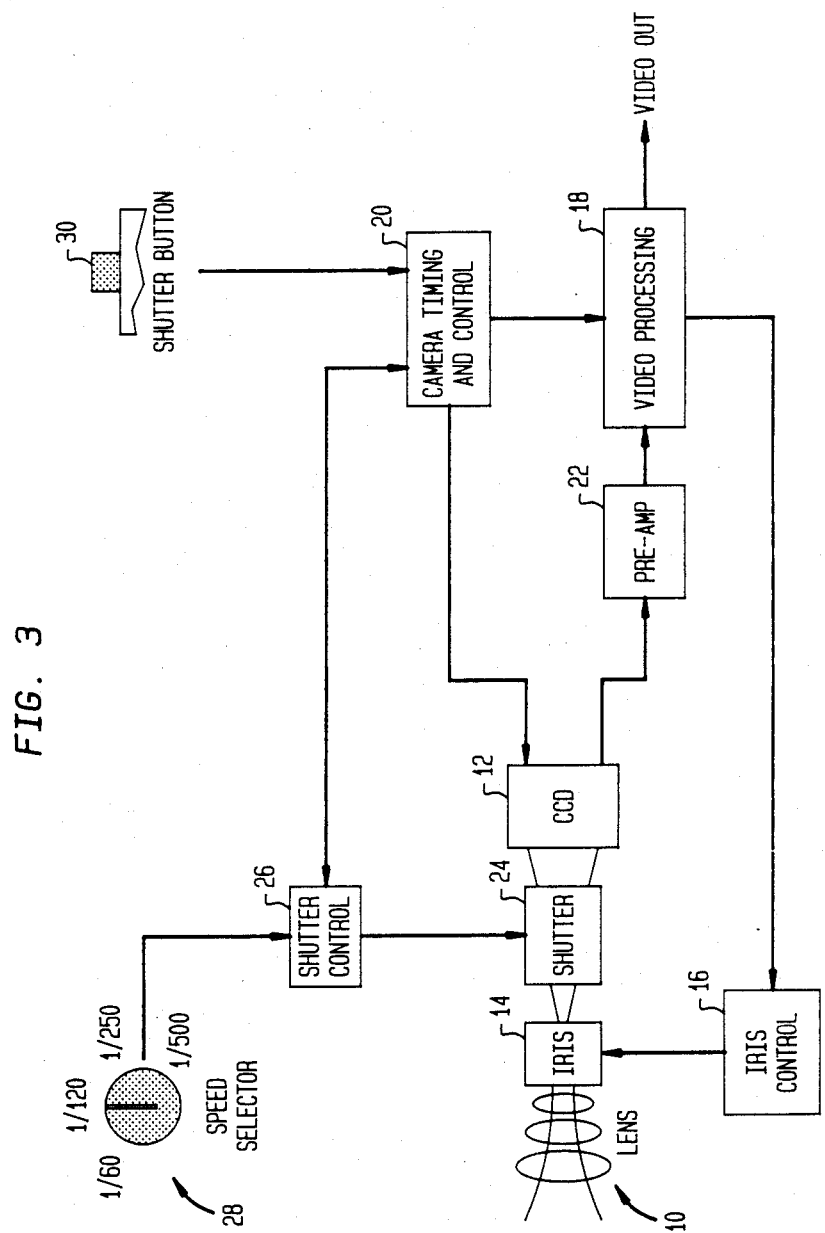
FIG. 3 is a block diagram illustration of the electronic imaging system of the present invention.

In FIG. 3 of the drawings, components of the video imaging system incorporating the present invention are shown in block diagram form to include a conventional lens 10 for focusing a light image on a CCD sensor 12 through a variable aperture iris diaphragm 14 operated by an iris control circuit 16 in response to imaging light detected at a video processing circuit 18. Also in accordance with conventional practice, a camera timing and control circuit 20 interacts with the video processing circuit 18 and the CCD 12 to control the integration and readout of information from the CCD through a preamp circuit 22 to the video processing circuit 18.

In addition to the described conventional components, the system of the present invention includes a mechanical shutter 24 to be described in more detail below, a shutter control circuit 26, a manually adjustable still mode shutter speed selector 28 and a still mode shutter button 30. The manner in which these latter components operate in the practice of the present invention will be understood from the description to follow.

In FIG. 4, the physical orientation of the iris diaphragm 14 and the shutter 24 in relation to the lens 10, the CCD 12 and the optical axis 32 of the lens is shown. In this context, it will be noted that the shutter 24 is between the diaphragm 14 and the CCD 12 and while not illustrated as such in FIG. 4, will be positioned in practice as close as possible to the CCD 12 in keeping with such design criteria as the exposure area of the CCD 12 relative to overall camera size and configuration, focal length of lens 10 and the like.

As shown most clearly in FIGS. 5-7 of the drawings, the shutter 24 is defined structurally by a pair of reciprocable, planar blades 34 and 36 of thin, lightweight material such as Mylar or other material of comparable physical characteristics. The blades 34 and 36 are of identical elongated rectangular exterior configuration as shown in FIG. 6 and at one end portion are formed with laterally offset longitudinal openings 38 and 40, respectively. One edge of each opening 38 and 40 is formed with teeth to provide a linear rack 42 on the blade 34 and a similar rack 44 on the blade 36. In the assembled shutter 24, the blades 34 and 36 are superimposed in laterally offset relation as shown in FIG. 7 so that each rack 42 and 44 is presented along opposite sides of the overlapping portions of the openings 38 and 40 in a position to be in meshing engagement with separate pinion gears 46 and 48, respectively. As shown most clearly in FIG. 5, the gear 46 is connected to be driven by a stepping motor 50 whereas the gear 48 is drivably connected to a separate stepping motor 52. The stepping motors are operated by the shutter control circuit 26 which effects closed loop control, using positional feedback from encoder slots 54 and 56 provided along the opposite edges of the respective blades 34 and 36, which edges project from the superimposed portion of the blades as they are laterally offset in the assembled shutter 24.

The end portion of each blade opposite the end portion occupied by the openings 38 and 40 may be characterized as the operative portion in which are provided three rectangular sectors in each of the blades; namely, a filter sector 58, a transparent or open sector 60 and an opaque or light blocking sector 62 in the blade 34 and opaque, open or transparent, and filter sectors 64, 66 and 68, respectively in the blade 36. It should be noted that while the open or transparent sectors 60 and 66 as well as the filter sectors 58 and 68 will be delineated in the blades 34 and 36, the opaque sectors 62 and 64 are delineated principally to facilitate an explanation of the shutter 24 with reference to the drawing illustration. In other words and in practice, the opaque sectors 62 and 64 could be established very simply by forming the blades 34 and 36 from opaque material.

In the illustrated embodiment, the shutter speed selector 28 (FIG. 3) is adjustable to any one of four still mode shutter speeds, that is, 1/60, 1/120, 1/250 and 1/500 seconds. These particular shutter speeds are related in that for a given intensity of image light presented to the CCD 12, correct exposure at the respective speeds will require lens aperture variation in increments of one f-stop. Thus, a shutter speed of 1/120 second will require a lens aperture increase by one f-stop over that required at shutter speeds of 1/60 second for the same image light intensity; a shutter speed of 1/250 second will require a lens aperture increase by two f-stops relative to the 1/60 second speed and a shutter speed of 1/500 second will require a lens aperture increase by three f-stops over the 1/60 speed. In light of the number of still mode shutter speeds contemplated by the illustrated embodiment, therefore, and in accordance with the present invention, a combination of four different f-stop filter attenuations are provided by the blades of the shutter 24. Specifically, and with reference to FIGS. 7-10 of the drawings, registration of both open sectors 60 and 66 on the blades 34 and 36 with the axis 32 as shown in FIG. 7 will have no attenuating effect on the light passing the diaphragm 14; registration of the filter sector 58 on the blade 34 and the open sector 66 on the blade 36 with the axis 32 as shown in FIG. 8 will attenuate light passing the iris diaphragm 14 by one f-stop; registration of the filter sector 68 on the blade 36 with the open sector 60 on the blade 34 as shown in FIG. 9 will attenuate light passing the iris diaphragm 14 by two f-stops; and registration of both filter sectors 58 and 68 with the axis 32 as shown in FIG. 10 will attenuate light passing the iris diaphragm 14 to the CCD 12 by three f-stops. Because of the central position of the open sectors in both blades, and the positioning of the filter sectors 58 and 68 on opposite ends of the open sectors 60, 62 of the respective blades, relative positioning of the blades in the attainment of the several stops of attenuation proceeds from one of longitudinal registration in FIG. 7 to one extreme longitudinal offset relation in FIG. 10.

In FIGS. 11 and 12, various relative positions of the blades 34 and 36 are shown during operation of the mechanical shutter 24 to expose the CCD to a still image. In FIG. 11, both blades are shown in an extreme longitudinal position the opposite of that shown in FIG. 10 so that both opaque sectors 62 and 64 on the blades register with the optical axis 32. While this relative position will clearly block passage of light on the axis 32 in a closed shutter condition, relative blade position in which only one of the opaque sectors 62 or 64 is positioned fully over the light passageway to the CCD 12 will be equally effective to close the shutter. As a result, blade movement to open and close the shutter 24 may follow a variety of sequences. For example, with the blades initially positioned as shown in FIG. 11, both blades may move to a position of registry as shown in FIG. 7 for an open shutter condition followed by reverse movement of both blades to the position shown in FIG. 11. On the other hand, with one of the two blades 34 positioned so that the opening 60 or 66 is in registry with the axis 32, the other blade may be moved from a shutter closed position to an open condition followed by movement of the first blade to return the shutter to a closed condition. Still further, and as represented in FIG. 12 of the drawings, one of the blades may be positioned so that its opaque sector 62, 64 is in a closed shutter position whereas the opaque sector of the other blade is positioned so that one edge lies adjacent to the opaque sector of a first-mentioned blade. By partially opening the initial blocking blade followed by movement of the originally non-blocking blade, a scanning shutter operation may be effected in which the CCD is exposed by a slot traversing the light path of exposure. This last-mentioned mode of shutter operation might be used for example to establish the higher speed modes of shutter operation of those indicated.

Figure 1:
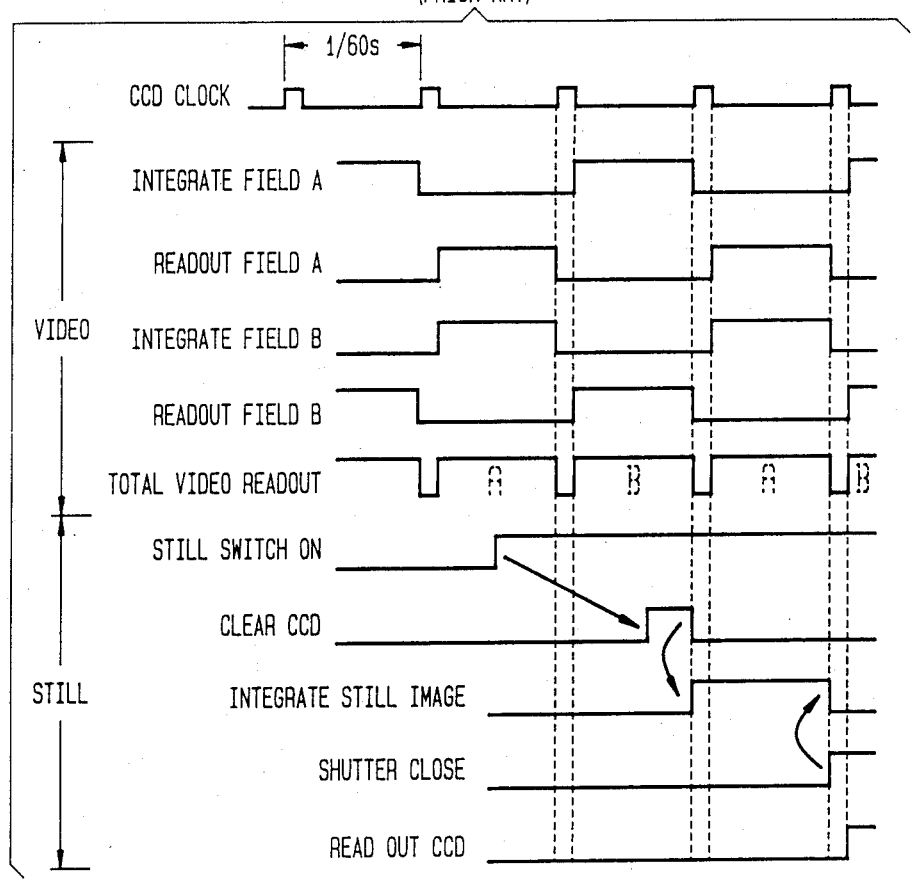
FIG. 1 is a timing diagram representing operation of a conventional prior-art dual electronic imaging camera.
Figure 2:
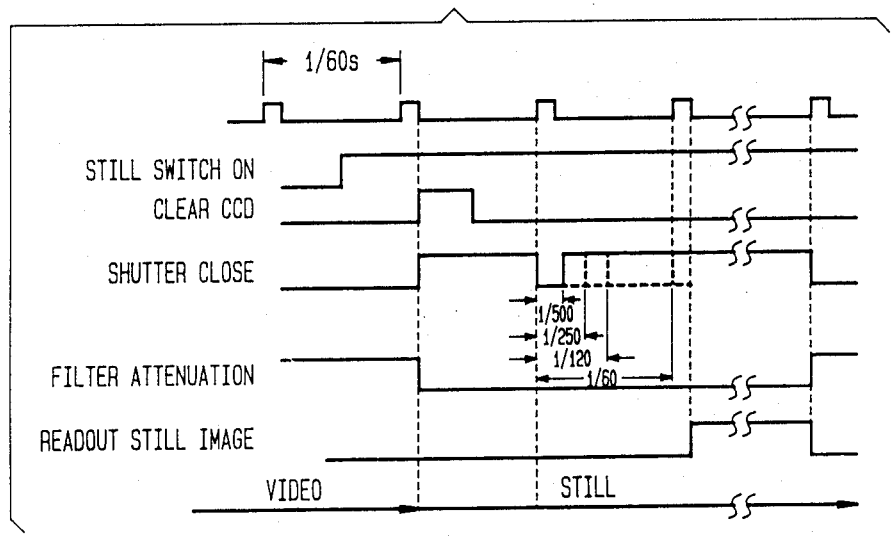
FIG. 2 is a similar diagram in accordance with operation of the present invention.

Operation of the dual mode exposure system of the present invention may be understood by reference to FIGS. 2 and 3 of the drawings. In this respect, operation in the video mode is identical to conventional cameras in the sense that a motion picture image of a moving subject being photographed may be viewed in a CRT screen (not shown) conventionally incorporated in video cameras. Either before or after operation in the video mode but in any event before a still picture is to be exposed, the shutter speed selector 28 is adjusted to one of the still mode shutter speeds indicated in FIG. 3. While framing a still image to be photographed using the system in a video mode to present an image on the unillustrated CRT screen, the selection of shutter speed will result in adjustment of the shutter 24 to impose in the aforementioned manner a corresponding filter attenuation behind the iris diaphragm causing the iris control circuit to open the iris diaphragm by a comparable stop value. When it is desired to record a still photograph, the shutter button 30 is depressed. Upon depression of the shutter button 30 and as shown most clearly in FIG. 2 of the drawings, the CCD 12 will be cleared in substantially less time than the next ensuing 1/60 second. Because the CCD is relatively light sensitive during this clearing interval, the shutter 24 is adjusted to a closed condition prior to clearing and thus also removes filter attenuation from the optical path behind the iris diaphragm 14. Since exposure of the CCD can begin immediately upon termination of its clearing, the exposure in the still mode will begin upon opening of the shutter 24. Thus and as shown in FIG. 2, where operation for a shutter speed of 1/500 second is depicted, the closing shutter blade (FIG. 12) will close 1/500 second after the opening shutter blade uncovers the CCD. Following the still exposure, the still image to which the CCD 12 was exposed will be read out and the system will return to video operation unless the shutter button 30 is again depressed or retained in a depressed condition. In this latter situation, the particular configuration of the shutter 24 will allow a series of still images to be recorded periodically with a single movement of the shutter blades for each still image exposure. In other words, the blades may traverse the light path to the CCD in one direction for a first still photograph and traverse the same path in the opposite direction for the next still photograph and so forth if a succession of still picture images is desired. Although mechanical shuttering has been described as operating during the time that the CCD is cleared, it will be readily understood that for CCDs that are not light sensitive during this clearing interval, the shutter 24 need not be initially moved into the light blocking position and the exposure may be commenced electronically immediately after the CCD is cleared.

Thus, it will be appreciated that as a result of the present invention, a highly effective exposure control system for dual mode electronic imaging cameras is provided and by which the stated objectives, among others, are completely fulfilled. It is contemplated that modifications and/or changes may be made in the illustrated embodiment without departure from the invention. For example, while four shutter speeds separated by light values corresponding to full aperture stops are demonstrated in the illustrated embodiment, additional shutter speeds may be used either by adding a corresponding number of attenuating combinations of filter sectors to the blades 34 and 36 or by using combinations of variable attenuation filter wedges in place of the sectors 58 and 60. With respect to potential shutter speeds, experience with stepping motors has demonstrated that the blades 34 and 36 can traverse the focal plane of the CCD 12 in approximately 7 milliseconds and that the motors can be operated to control the width of a slot in the scanning shutter mode described with reference to FIG. 12 to achieve exposure times as short as 1 millisecond (1/1000 second). Thus the system of the present invention requires only a combination of filter attenuation values to augment a greater number of shutter speeds available for exposure of the CCD in a still mode of system operation.

Further, it will be apparent to those skilled in the art from the foregoing description and accompanying drawings that additional modifications and/or changes may be made, again without departure from the invention. Accordingly, it is expressly intended that the foregoing description and accompanying drawings are illustrative of a preferred embodiment only, not limiting, and that the true spirit and scope of the present invention be determined by reference to the appended claims.

What is claimed is:

1. The method of exposure control for electronic imaging cameras having means including an image-receiving sensor for recording video fields at a rate to establish a predetermined video time interval of sensor exposure, variable aperture means for controlling the amount of image light to which said sensor is exposed during said video time interval, means responsive to the amount of image light detected at said sensor for automatically adjusting said aperture means, means for switching the camera between motion picture video and still picture modes of operation, and means for exposing said sensor in said still picture mode of operation at a still exposure time interval shorter than said video time interval, said method comprising the steps of:

attenuating image light passing said variable aperture means during said video mode of operation, thereby to increase the aperture stop value of said variable aperture means to the correct value required for said still exposure interval; and passing all image light unattenuated through said variable aperture means at the increased stop value for exposure of said sensor during said still exposure time interval.

2. The method recited in claim 1 wherein said still exposure interval further includes the steps of:

initiating said still exposure time interval by mechanically unblocking the passage of image light to said sensor; and terminating said still exposure time interval by mechanically blocking the passage of image light to said sensor.

3. The method recited in claim 2 further including the steps of:

clearing said sensor immediately before said still exposure time interval; and mechanically blocking the passage of image light to said sensor during said clearing of said sensor.

4. In an exposure control system for electronic imaging cameras having means including an image receiving sensor for recording video fields at a rate to establish a predetermined video time interval of sensor exposure, variable aperture means for controlling the amount of image light to which said sensor is exposed during said video time interval, means responsive to the amount of image light detected at said sensor for automatically adjusting said aperture means, and means for switching the camera between motion picture video and still picture modes of operation, the improvement comprising:

means for exposing said sensor in said still picture mode of operation at a still exposure time interval shorter than said video time interval; and means for attenuating image light passing said variable aperture means during said video mode of operation, thereby to increase the aperture stop value of said variable aperture means during said video mode of operation to the correct value required for said still exposure interval.

5. The exposure control system recited in claim 4 wherein said means for exposing said sensor in said still picture mode comprises a mechanical shutter means for initiating and terminating said still exposure time interval.

6. The exposure control system recited in claim 5 wherein said sensor is relatively insensitive to image light for a clearing time interval and wherein said means for exposing said sensor in said still picture mode also operates to block image light from said sensor during said clearing time interval.

7. The exposure control system recited in claim 6 including means for disabling said means for attenuating during said clearing time interval.

8. The exposure control system recited in claim 5 wherein said shutter means is located between said variable aperture means and said sensor.

9. The exposure control system recited in claim 8 wherein said mechanical shutter means comprises a pair of superimposed, reciprocable shutter blades, each having at least an open sector and an opaque sector, and means for reciprocating said blades for registration of said open sectors to provide an open shutter condition and for movement of at least one of said opaque sectors to a light blocking closed shutter condition.

10. The exposure control system recited in claim 9 wherein said means for reciprocating said blades includes means for positioning said open sectors and said opaque sectors to establish a slot opening and for reciprocating said blades to traverse the light path to said sensor with said slot.

11. The exposure control system recited in claim 8 wherein said means for attenuation is carried by said shutter means.

12. The exposure control system recited in claim 11 wherein said shutter means comprises a pair of superimposed reciprocable shutter blades, each of said blades carrying a light attenuating filter sector of different light attenuating characteristics.

13. The exposure control system recited in claim 12 including means for selecting any one of a plurality of still exposure time intervals and for operating said mechanical shutter means at a speed corresponding to the selected interval, said light attenuating filter sectors providing light attenuation during video mode to maintain said variable aperture means substantially constant for correct exposure of said sensor at each of still exposure time intervals.

14. The exposure control system recited in claim 13 wherein said plurality of still exposure time intervals differ from each other by durations corresponding to 1 f-stop of required aperture opening for proper exposure of said sensor in said still picture mode.

15. In an exposure control system for electronic imaging cameras having means including an image receiving sensor for recording video fields at a rate to establish a predetermined video time interval of sensor exposure, variable aperture means for controlling the amount of image light to which said sensor is exposed during said video exposure time interval, means responsive to the amount of image light detected at said sensor for automatically adjusting said aperture means, and means for switching the camera between motion picture video and still picture modes of operation, the improvement comprising:

a shutter mechanism positioned between said variable aperture means and said sensor, said shutter mechanism including filter means for attenuating image light passing to said sensor during the video mode of operation and light blocking means for initiating and terminating exposure of said sensor during the still mode of operation.

16. The exposure control system recited in claim 15 wherein said shutter mechanism comprises a pair of relatively movable shutter blades cooperable by relative movement in relation to an image light path between said variable aperture means and said sensor to establish a filter condition, an open condition and a light blocking condition.

17. The exposure control system recited in claim 16 wherein each of said blades includes a filter sector, an open sector and an opaque sector, said filter condition being established by positioning the filter sector of at least one of said blades in said image light path, said open condition being established by positioning the open sectors of both blades in said light path and said light blocking condition being established by positioning the opaque sector of at least one of said blades in said light path.

18. The exposure control system recited in claim 16 wherein said shutter blades are at least partially superimposed elongated blades and including separate drive means for positioning each blade.

19. The exposure control system recited in claim 16 wherein said shutter blades are spaced relative to each other such that said open sectors partially overlap to define a slot which traverses the light path of exposure during the still mode of operation.

20. The exposure control system recited in claim 19 wherein said drive means comprises means defining a linear rack on each of said blades, a pinion gear in mesh with each of said linear racks and a stepping motor for driving each of said pinion gears.

21. A combined shutter and light attenuating filter mechanism comprising:

a pair of elongated light weight shutter blades positioned in at least partially superimposed relation;

independent drive means for moving said blades in relation to each other and to an image light path;

each of said blades having a filter sector, an open sector and an opaque sector arranged so that upon relative positioning of said blades by said drive means, said filter sectors and said open sectors may be combined to provide a plurality of filter attenuation values and said open sectors and said opaque sectors may be combined to provide a plurality of shutter opening and closing modes.

* * * * *